(12) United States Patent
Ceraldi et al.

(10) Patent No.: US 11,077,371 B2
(45) Date of Patent: Aug. 3, 2021

(54) SYSTEMS AND METHODS FOR CUSTOMIZED CAMERA VIEWS IN VIRTUALIZED ENVIRONMENTS

(71) Applicant: Hothead Games Inc., Vancouver (CA)

(72) Inventors: James Paul Ceraldi, Surrey (CA); Brad Steeves, Vancouver (CA); Bryan Brandt, Vancouver (CA)

(73) Assignee: Hothead Games Inc., Vancouver (CA)

( * ) Notice: Subject to any disclaimer, the term of this patent is extended or adjusted under 35 U.S.C. 154(b) by 0 days.

(21) Appl. No.: 16/814,773

(22) Filed: Mar. 10, 2020

(65) Prior Publication Data
US 2020/0206624 A1    Jul. 2, 2020

Related U.S. Application Data

(63) Continuation of application No. 15/886,741, filed on Feb. 1, 2018, now Pat. No. 10,589,175, which is a
(Continued)

(51) Int. Cl.
*A63F 13/5258* (2014.01)
*A63F 13/2145* (2014.01)
(Continued)

(52) U.S. Cl.
CPC ...... *A63F 13/5258* (2014.09); *A63F 13/2145* (2014.09); *A63F 13/42* (2014.09); *A63F 13/525* (2014.09); *A63F 13/5252* (2014.09); *A63F 13/5255* (2014.09); *A63F 13/837* (2014.09); *A63F 13/86* (2014.09)

(58) Field of Classification Search
CPC .............. A63F 13/5258; A63F 13/2145; A63F 13/525; A63F 13/5252; A63F 13/5255; A63F 13/837
See application file for complete search history.

(56) References Cited

U.S. PATENT DOCUMENTS

| 5,662,332 A | 9/1997 | Garfield |
| 5,772,512 A | 6/1998 | Chichester |

(Continued)

FOREIGN PATENT DOCUMENTS

| CA | 2403006 A1 | 9/2001 |
| CA | 2763349 A1 | 7/2012 |

(Continued)

OTHER PUBLICATIONS

Rrvirus screenshots "Kill Shot (By Hothead Games)—iOS—iPhone/iPad/iPod Touch Gameplay" published Jun. 15, 2014. (Year: 2014).*
(Continued)

*Primary Examiner* — James S. McClellan
(74) *Attorney, Agent, or Firm* — Carr & Ferrell LLP

(57) ABSTRACT

Systems and methods for providing customized camera views of virtualized environments are provided herein. In one embodiment a method includes detecting a gameplay event of interest within a virtual gaming environment and displaying a customized camera view of the gameplay event of interest based on user input receiving during traversal of a projectile from a weapon to a target. The customized camera view has a focal point of the projectile.

17 Claims, 10 Drawing Sheets

Related U.S. Application Data continuation of application No. 15/195,943, filed on Jun. 28, 2016, now Pat. No. 10,004,991.

(51) Int. Cl.
| | |
|---|---|
| *A63F 13/86* | (2014.01) |
| *A63F 13/42* | (2014.01) |
| *A63F 13/525* | (2014.01) |
| *A63F 13/5252* | (2014.01) |
| *A63F 13/5255* | (2014.01) |
| *A63F 13/837* | (2014.01) |

(56) References Cited

U.S. PATENT DOCUMENTS

| | | | |
|---|---|---|---|
| 5,813,913 A | 9/1998 | Berner et al. | |
| 6,174,237 B1 | 1/2001 | Stephenson | |
| 6,648,760 B2 | 11/2003 | Nicastro | |
| 7,666,094 B2 | 2/2010 | Baerlocher et al. | |
| 7,867,086 B2 | 1/2011 | Sitrick | |
| 7,881,976 B2 | 2/2011 | Dayton et al. | |
| 8,002,618 B1 | 8/2011 | Lockton et al. | |
| 8,149,530 B1 | 4/2012 | Lockton et al. | |
| 8,209,628 B1 | 6/2012 | Davidson | |
| 8,291,492 B2 | 10/2012 | McNally et al. | |
| 8,365,074 B1 | 1/2013 | Wagner et al. | |
| 8,385,596 B2 | 2/2013 | Latta et al. | |
| 8,597,142 B2 | 12/2013 | Mayles et al. | |
| 8,608,485 B2 | 12/2013 | Teasdale et al. | |
| 8,619,080 B2 | 12/2013 | Avent et al. | |
| 8,645,396 B2 | 2/2014 | McNally et al. | |
| 8,684,820 B2 | 4/2014 | DeYoung | |
| 9,056,251 B2 | 6/2015 | Lockton | |
| 9,195,369 B2 | 11/2015 | We et al. | |
| 9,254,437 B2 | 2/2016 | Short et al. | |
| 9,283,480 B2 | 3/2016 | DeYoung | |
| 9,286,752 B2 | 3/2016 | Robbins et al. | |
| 9,586,145 B2 | 3/2017 | DeYoung | |
| 9,652,937 B2 | 5/2017 | Lockton | |
| 9,729,765 B2 | 8/2017 | Balakrishnan et al. | |
| 9,919,213 B2 | 3/2018 | Dunn | |
| 10,004,991 B2 | 6/2018 | Ceraldi et al. | |
| 10,010,791 B2 | 7/2018 | Ceraldi et al. | |
| 10,156,970 B2 | 12/2018 | We et al. | |
| 10,589,175 B2 | 3/2020 | Ceraldi et al. | |
| 10,744,412 B2 | 8/2020 | Ceraldi et al. | |
| 10,761,699 B2 | 9/2020 | We et al. | |
| 2001/0025253 A1 | 9/2001 | Heintz et al. | |
| 2002/0043764 A1 | 4/2002 | Imhof | |
| 2002/0142842 A1 | 10/2002 | Easley et al. | |
| 2003/0038805 A1 | 2/2003 | Wong et al. | |
| 2003/0127798 A1 | 7/2003 | Burrowes | |
| 2004/0193484 A1 | 9/2004 | Allen | |
| 2004/0227292 A1 | 11/2004 | Bodish | |
| 2005/0079912 A1 | 4/2005 | Hanafusa | |
| 2005/0184457 A1 | 8/2005 | Frieman | |
| 2005/0282614 A1 | 12/2005 | Gauselmann | |
| 2006/0082068 A1 | 4/2006 | Patchen | |
| 2006/0135232 A1 | 6/2006 | Willis | |
| 2006/0178952 A1 | 8/2006 | Harris | |
| 2006/0242554 A1 | 10/2006 | Gerace et al. | |
| 2006/0284852 A1 | 12/2006 | Hofmeister et al. | |
| 2006/0287106 A1 | 12/2006 | Jensen | |
| 2007/0015586 A1 | 1/2007 | Huston | |
| 2007/0057951 A1 | 3/2007 | Anthony et al. | |
| 2007/0087835 A1 | 4/2007 | Van Luchene | |
| 2007/0152984 A1 | 7/2007 | Ording et al. | |
| 2007/0191101 A1 | 8/2007 | Coliz et al. | |
| 2007/0191102 A1 | 8/2007 | Coliz et al. | |
| 2007/0265063 A1 | 11/2007 | McNally | |
| 2008/0026847 A1 | 1/2008 | Mueller et al. | |
| 2008/0058092 A1 | 3/2008 | Schwartz et al. | |
| 2008/0090659 A1 | 4/2008 | Aguilar et al. | |
| 2008/0147424 A1 | 6/2008 | Rowan et al. | |
| 2008/0162261 A1 | 7/2008 | Velazquez et al. | |
| 2008/0163055 A1 | 7/2008 | Ganz et al. | |
| 2008/0215420 A1 | 9/2008 | Angelica | |
| 2008/0228580 A1 | 9/2008 | Korman et al. | |
| 2008/0261680 A1 | 10/2008 | Buecheler et al. | |
| 2008/0270240 A1 | 10/2008 | Chu | |
| 2009/0043868 A1 | 2/2009 | Hathaway | |
| 2009/0072483 A1 | 3/2009 | Salomon et al. | |
| 2009/0149236 A1 | 6/2009 | Van Luchene | |
| 2009/0153389 A1 | 6/2009 | Kerr et al. | |
| 2009/0157491 A1 | 6/2009 | Brougher et al. | |
| 2009/0164937 A1 | 6/2009 | Alviar et al. | |
| 2009/0165128 A1 | 6/2009 | McNally et al. | |
| 2009/0181770 A1 | 7/2009 | Viner et al. | |
| 2009/0199275 A1 | 8/2009 | Brock et al. | |
| 2009/0209335 A1 | 8/2009 | Pearce | |
| 2009/0322498 A1 | 12/2009 | Yun et al. | |
| 2010/0013761 A1 | 1/2010 | Birnbaum et al. | |
| 2010/0060661 A1 | 3/2010 | Avent et al. | |
| 2010/0063993 A1 | 3/2010 | Higgins et al. | |
| 2010/0082798 A1 | 4/2010 | Bhogal et al. | |
| 2010/0122174 A1 | 5/2010 | Snibbe et al. | |
| 2010/0123658 A1 | 5/2010 | Demuynck et al. | |
| 2010/0203952 A1 | 8/2010 | Zalewski | |
| 2010/0261526 A1 | 10/2010 | Anderson et al. | |
| 2010/0268580 A1 | 10/2010 | Vermes | |
| 2010/0324981 A1 | 12/2010 | Etchegoyen | |
| 2011/0028219 A1 | 2/2011 | Heatherly et al. | |
| 2011/0093778 A1 | 4/2011 | Kim et al. | |
| 2011/0095993 A1 | 4/2011 | Zuverink | |
| 2011/0165926 A1 | 7/2011 | Hall | |
| 2011/0183738 A1 | 7/2011 | Kirnstotter | |
| 2011/0184791 A1 | 7/2011 | Wang | |
| 2011/0185318 A1 | 7/2011 | Hinckley et al. | |
| 2011/0246335 A1 | 10/2011 | Li | |
| 2011/0264491 A1 | 10/2011 | Birnbaum et al. | |
| 2011/0264532 A1 | 10/2011 | Chan et al. | |
| 2011/0300916 A1 | 12/2011 | Patchen | |
| 2011/0300923 A1 | 12/2011 | Van Luchene | |
| 2011/0306428 A1 | 12/2011 | Lockton et al. | |
| 2012/0023444 A1 | 1/2012 | Patil et al. | |
| 2012/0029990 A1 | 2/2012 | Fisher | |
| 2012/0058808 A1 | 3/2012 | Lockton | |
| 2012/0109728 A1 | 5/2012 | Sparks | |
| 2012/0184349 A1 | 7/2012 | Barclay et al. | |
| 2012/0232973 A1 | 9/2012 | Robb et al. | |
| 2012/0246301 A1 | 9/2012 | Vyrros et al. | |
| 2012/0274662 A1 | 11/2012 | Kim et al. | |
| 2012/0290308 A1 | 11/2012 | Detwiller et al. | |
| 2012/0290654 A1 | 11/2012 | Detwiller et al. | |
| 2012/0309477 A1 | 12/2012 | Mayles et al. | |
| 2013/0002565 A1 | 1/2013 | Tumanov et al. | |
| 2013/0112202 A1 | 5/2013 | Fogelbrink | |
| 2013/0127731 A1 | 5/2013 | Song et al. | |
| 2013/0184040 A1 | 7/2013 | Nonaka et al. | |
| 2013/0203480 A1 | 8/2013 | DeYoung | |
| 2013/0205255 A1 | 8/2013 | We et al. | |
| 2013/0218733 A1 | 8/2013 | Rago et al. | |
| 2013/0288787 A1 | 10/2013 | Yoshie et al. | |
| 2013/0296036 A1 | 11/2013 | Scott | |
| 2013/0310169 A1 | 11/2013 | Satsuma | |
| 2013/0344960 A1 | 12/2013 | Perry et al. | |
| 2014/0047380 A1 | 2/2014 | Mak | |
| 2014/0118563 A1* | 5/2014 | Mehta | H04N 1/0044 348/207.1 |
| 2014/0179409 A1 | 6/2014 | DeYoung | |
| 2014/0200061 A1 | 7/2014 | Isa et al. | |
| 2014/0210164 A1 | 7/2014 | MacDonald et al. | |
| 2014/0256389 A1 | 9/2014 | Wentling et al. | |
| 2014/0274239 A1 | 9/2014 | Han | |
| 2014/0274409 A1 | 9/2014 | Tinsman et al. | |
| 2014/0325429 A1 | 10/2014 | Chang | |
| 2014/0349723 A1 | 11/2014 | Nakatani et al. | |
| 2014/0358632 A1 | 12/2014 | Graff et al. | |
| 2014/0378222 A1 | 12/2014 | Balakrishnan et al. | |
| 2015/0046856 A1 | 2/2015 | Rucker et al. | |
| 2015/0094150 A1 | 4/2015 | Gregory et al. | |
| 2015/0182854 A1 | 7/2015 | Edsall et al. | |
| 2015/0182856 A1 | 7/2015 | Mays, III et al. | |
| 2015/0238862 A1 | 8/2015 | Suzuki | |

(56) References Cited

U.S. PATENT DOCUMENTS

| | | |
|---|---|---|
| 2015/0382066 A1 | 12/2015 | Heeter et al. |
| 2016/0023106 A1 | 1/2016 | Mizuno |
| 2016/0026369 A1 | 1/2016 | We et al. |
| 2016/0096111 A1 | 4/2016 | DeYoung |
| 2016/0096113 A1 | 4/2016 | Decoufle |
| 2016/0236078 A1 | 8/2016 | Tokunaga |
| 2017/0014718 A1 | 1/2017 | Ceraldi et al. |
| 2017/0028303 A1 | 2/2017 | DeYoung |
| 2017/0036119 A1 | 2/2017 | Nielsen et al. |
| 2017/0072315 A1 | 3/2017 | Wada et al. |
| 2017/0282076 A1* | 10/2017 | Tsui .................. A63F 13/56 |
| 2017/0319961 A1* | 11/2017 | Dunn .................. A63F 13/837 |
| 2017/0368460 A1 | 12/2017 | Ceraldi et al. |
| 2017/0368461 A1 | 12/2017 | Ceraldi et al. |
| 2018/0154261 A1 | 6/2018 | Ceraldi et al. |
| 2018/0214773 A1 | 8/2018 | Ceraldi et al. |
| 2019/0095081 A1 | 3/2019 | We et al. |
| 2020/0368620 A1 | 11/2020 | Ceraldi et al. |
| 2020/0387293 A1 | 12/2020 | We et al. |

FOREIGN PATENT DOCUMENTS

| | | | |
|---|---|---|---|
| EP | 2182421 | A1 | 5/2010 |
| EP | 2812088 | A1 | 12/2014 |
| EP | 2812830 | A1 | 12/2014 |
| EP | 3117883 | A1 | 1/2017 |
| EP | 3127587 | A1 | 2/2017 |
| JP | 2001286678 | A | 10/2001 |
| JP | 2001340656 | A | 12/2001 |
| JP | 2002253859 | A | 9/2002 |
| JP | 2003135854 | | 5/2003 |
| JP | 2004195165 | A | 7/2004 |
| JP | 2005270649 | | 10/2005 |
| JP | 2006014956 | A | 1/2006 |
| JP | 2006094877 | A | 4/2006 |
| JP | 2007061317 | A | 2/2007 |
| JP | 2007215721 | | 8/2007 |
| JP | 2008508600 | A | 3/2008 |
| JP | 2009526603 | | 7/2009 |
| JP | 2009195415 | | 9/2009 |
| JP | 2009205462 | A | 9/2009 |
| JP | 2010088560 | A | 4/2010 |
| JP | 2010131083 | | 6/2010 |
| JP | 2010148812 | A | 7/2010 |
| JP | 2010167251 | | 8/2010 |
| JP | 2011172253 | A | 9/2011 |
| JP | 2012043266 | A | 3/2012 |
| JP | 4975880 | B1 | 7/2012 |
| JP | 2012133745 | A | 7/2012 |
| JP | 2012160171 | A | 8/2012 |
| JP | 2013208219 | A | 10/2013 |
| JP | 2013226232 | A | 11/2013 |
| JP | 2014171860 | A | 9/2014 |
| JP | 2015008984 | A | 1/2015 |
| JP | 2015073745 | A | 4/2015 |
| JP | 2015077366 | A | 4/2015 |
| JP | 2015091291 | A | 5/2015 |
| JP | 6235084 | B2 | 11/2017 |
| JP | 6243356 | B2 | 11/2017 |
| JP | 6345734 | B2 | 6/2018 |
| JP | 6523367 | B2 | 5/2019 |
| KR | 100507587 | B1 | 8/2005 |
| KR | 1020070090730 | A | 9/2007 |
| KR | 1020100069730 | A | 6/2010 |
| KR | 1020100124428 | A | 11/2010 |
| KR | 1020110017188 | A | 2/2011 |
| KR | 1020170008697 | A | 1/2017 |
| KR | 1020170016801 | | 2/2017 |
| KR | 101725073 | | 4/2017 |
| KR | 101754318 | B1 | 6/2017 |
| KR | 1020170124964 | A | 11/2017 |
| KR | 101919898 | | 11/2018 |
| WO | WO2001069364 | A2 | 9/2001 |
| WO | WO2011019188 | A2 | 2/2011 |
| WO | WO2013116926 | A1 | 8/2013 |
| WO | WO2013119702 | A1 | 8/2013 |
| WO | WO2014103634 | A1 | 7/2014 |
| WO | WO2017190228 | A1 | 11/2017 |
| WO | WO2018000085 | A1 | 1/2018 |

OTHER PUBLICATIONS

Falcon 4.0 instruction manual published 1998 (Year: 1998).*

Patent Cooperation Treaty Application No. PCT/US2013/024981, "International Search Report" and "Written Opinion of International Searching Authority," dated Apr. 15, 2013, 14 pages.

Patent Cooperation Treaty Application No. PCT/CA 2013/000101, "International Search Report" and Written Opinion of the International Searching Authority, dated Apr. 15, 2013, 10 pages.

Extended European Search Report dated Dec. 11, 2014 in European Application No. 13746851.8, 6 pages.

Extended European Search Report dated Apr. 16, 2015 in European Application No. 13746523.3, 6 pages.

Dix, A., "Deconstructing Experience—pulling crackers apart" in: Blythe Funology: From Usability to Enjoyment, Human-Computer Interaction Series, (Dordecht, the Netherlands: Kluwer, 2003) ISBN 978-1-4020-2967-7, Ch. 13, pp. 165-178.

Office Action dated Aug. 28, 2015 in Korean Patent Application No. 10-2014-7024906 filed Sep. 4, 2014, 8 pages [19 pages including translation].

Office Action dated Nov. 11, 2015 in European Patent Application No. 13746851.8 filed Sep. 3, 2014, 5 pages.

Office Action dated Dec. 28, 2015 in Korean Patent Application No. 10-2014-7024936 filed Sep. 4, 2014, 7 pages [15 pages including translation].

Office Action dated Apr. 25, 2016 in Korean Patent Application No. 10-2014-7024906 filed Feb. 6, 2013, 5 pages [12 pages including translation].

RRvirus, Sniper X, Sep. 24, 2015, https://www.youtube.com/watch?v=v8LHzH9HVbl, 4 pages.

RRvirus, Hitman: Sniper, Jun. 4, 2015, https://www.youtube.com/watch?v=cJ4CPZUlzWg, 4 page.

Office Action dated Jul. 27, 2016 in Korean Patent Application No. 10-2014-7024936 filed Feb. 6, 2013, 4 pages [9 pages including translation].

Office Action dated Jun. 8, 2016 in European Patent Application No. 13746851.8 filed Feb. 6, 2013, 5 pages.

Ninja Theory Ltd, "Heavenly Sword manual" [online], Oct. 29, 2008 [retrieved on Sep. 16, 2016], Retrieved from the Internet: <URL:https://web.archive.org/web/20081029234359/http://fp.scea.com/Content/games/BCUS-98132/manual/manual.pdf>, 27 pages.

EightBitHD, "Heavenly Sword Walkthrough/Gameplay PS3 HD #1" [online], Oct. 7, 2012 [retrieved on Sep. 16, 2016], from the Internet: <URL:https://www.youtube.com/watch?v=qhOUHxsZKLU>, 3 pages.

Fouquet, Pierre, "A matter of slow death—Kill Cams: X-Ray Bullet Time" [online], Mar. 26, 2016 [retrieved on Sep. 16, 2016], Retrieved from the Internet: <URL:http://www.gameskinny.com/o408c/a-matter-of-slow-death-kill-cams-x-ray-bullet-time>, 7 pages.

artman_12, "Camera orbit around 3d object using swipe" [online], Dec. 14, 2013 [retrieved Sep. 17, 2016], Retrieved from the Internet: <URL:http://answers.unity3d.com/questions/596739/camera-orbit-around-3d-object-using-swipe.html>, 5 pages.

Rebellion, "Sniper Elite III manual" [online], Feb. 6, 2014 [retrieved Sep. 17, 2016], Retrieved from the Internet: <URL:http://cdn.akami.steamstatic.com/steam/apps/238090/manuals/SE3_PC_ENG_Manual.pdf>, 9 pages.

Office Action dated Nov. 29, 2016 in Korean Patent Application No. 10-2014-7024906 filed Feb. 6, 2013, 3 pages [7 pages including translation].

Korean Patent Application No. 1020147024936, "Notice of Allowance," dated Jan. 11, 2017, 2 pages [3 pages including translation].

Office Action dated Dec. 13, 2016 in Japanese Patent Application No. 2014-555857 filed Feb. 6, 2013, 6 pages [12 pages including translation].

"Extended European Search Report" and "Written Opinion," European Patent Application No. 16182337.2, dated Dec. 2, 2016, 10 pages.

(56) References Cited

OTHER PUBLICATIONS

"Hearthstone: Heroes of Warcraft," from Wikipedia, the Free Encyclopedia [online], Jul. 29, 2015 [retrieved on Nov. 23, 2016], Retrieved from the Internet: <URL:https://en.wikipedia.org/w/index.php?title=Hearthstone:_Heroes_ofWarcraft&oldid=673644287>, 12 pages.
"Extended European Search Report" and "Written Opinion," European Patent Application No. 16179484.7, dated Dec. 7, 2016, 10 pages.
"Office Action," Korean Patent Application No. 1020147024906, dated Jan. 26, 2017, 3 pages [6 pages including translation].
"Office Action," European Patent Application No. 13746851.8, dated Dec. 9, 2016, 4 pages.
"Office Action," Japanese Patent Application No. 2014-555047, dated Feb. 7, 2017, [7 pages including translation].
Chalk, Andy. Sniper Elite 3 Unveils Ridiculously Graphic "X-Ray Killcam" [online]. Feb. 17, 2014 9:25 PM [retrieved Feb. 22, 2017]. Retrieved from the Internet: <URL:http://www.escapistmagazine.com/news/view/132299-Sniper-Elite-3-Unveils-Ridiculously-Graphic-X-Ray-Killcam>, 1 page.
"Notice of Allowance," Korean Patent Application No. 1020147024906, dated Apr. 20, 2017, 2 pages [3 pages including translation].
Marc the Geek, Hitman Sniper for Android Review, Jun. 5, 2015, https://www.youtube.com/watch?v=aIMb7qtWnSA , times 1:52-1:54, 2:44-2:49, 3:38-3:40, 4:26-4:28, 4:48-4:54, 1 page.
"Dämon," Computer Fachlexikon Fachwörterbuch, Microsoft Press, Third Edition, 1997, 3 pages.
"Daemon (computing)," Wikipedia, Jun. 22, 2016. Retrieved from the Internet: <URL:https://en.wikipedia.org/w/index.php?title=Daemon_(computing)&oldid=726414138), pages.
"Notice of Allowance," European Patent Application No. 13746851.8, dated Jul. 18, 2017, 7 pages.
"Office Action," Japanese Patent Application No. 2014-555857, dated Jun. 20, 2017, [16 pages including translation].
"International Search Report" and "Written Opinion of the International Searching Authority," Patent Cooperation Treaty Application No. PCT/CA2017/050501, dated Aug. 8, 2017, 8 pages.
"Office Action," Japan Patent Application No. 2016-138659, dated Sep. 5, 2017, 7 pages (15 pages including translation).
"Daemon," Tech Terms, Sep. 22, 2017. Retrieved from the Internet: <URL:https://techterms.com/definition/daemon), 1 page.
"Notice of Allowance," Japanese Patent Application No. 2016151985, dated Sep. 26, 2017, 3 pages.
Omnomnick. CS:GO Update Adds Custom Weapon Skins [online]. Oct. 25, 2013 [retrieved Jun. 30, 2017]. Retrieved from the Internet: <URL:http://www.valvetime.net/threads/cs-go-update-adds-custom-weapon-skins.244024/>, 5 pages.
"International Search Report" and "Written Opinion of the International Searching Authority," Patent Cooperation Treaty Application No. PCT/CA2017/050775, dated Sep. 20, 2017, 9 pages.
"Notice of Allowance," Japan Patent Application No. 2014-555047, dated Oct. 17, 2017, 3 pages.
"Office Action," European Patent Application No. 16179484.7, dated Aug. 30, 2017, 7 pages.
"Office Action," Japan Patent Application No. 2014-555857, dated Feb. 27, 2018, 6 pages [13 pages including translation].
"Summons to Attend Oral Proceedings," European Patent Application No. 16182337.2, dated Jan. 16, 2018, 8 pages.
"Notice of Allowance," Japan Patent Application No. 2016-138659, dated Apr. 24, 2018, 3 pages.
"Office Action," Korea Patent Application No. 10-2017-0052810, dated Apr. 26, 2018, 4 pages [8 pages including translation].
Dove, arma 3 Sniper Guide, Jan. 10, 2016, https://www.youtube.com/watch?v=eyLkNOEGido, 1 page.
TouchGameplay, Sniper X Featuring Jason Statham (by Glu Games Inc.), Sep. 23, 2015, https://www.youtube.com/watch?v=JrMkZsf3Pq4, 1 page.
"Office Action," Korean Patent Application No. 10-2016-0098421, dated May 15, 2018, 4 pages [8 pages including translation].
"Notice of Allowance," European Patent Application No. 16179484.7, dated Jun. 29, 2018, 7 pages.
"Office Action," Japan Patent Application No. 2017-081022, dated Jul. 3, 2018, 5 pages [9 pages including translation].
VintageBeef. "Let's Play Journey-Ep1-Sandy" [online], Mar. 14, 2012 [retrieved on Aug. 26, 2018]. Retrieved from the Internet: <URL: https://www.youtube.com/watch?v=v0vnalRwlgM>, 5 pages.
Constantin, C.I. et al. "Tilt-controlled mobile games: Velocity-control vs. position-control." Proceedings of the 6th IEEE Consumer Electronics Society Games, Entertainment, Media Conference—IEEE-Gem 2014, pp. 24-30. [retrieved on Aug. 26, 2018]. Retrieved from the Internet: <URL: https://www.yorku.ca/mack/ieeegem2014a.html>.
"Notice of Allowance," Korea Patent Application No. 10-2016-0098421, dated Aug. 22, 2018, 2 pages [3 pages including translation].
"Office Action," Korea Patent Application No. 10-2017-0052810, dated Oct. 19, 2018, 2 pages [4 pages including translation].
"Notice of Allowance," Japan Patent Application No. 2017-081022, dated Apr. 2, 2019, 3 pages [6 pages including translation].

* cited by examiner

SYSTEMS AND METHODS FOR CUSTOMIZED CAMERA VIEWS IN VIRTUALIZED ENVIRONMENTS

CROSS REFERENCE TO RELATED APPLICATION

This patent application is a continuation of, and claims priority benefit of, U.S. patent application Ser. No. 15/886,741, filed Feb. 1, 2018, now U.S. Pat. No. 10,589,175, issued on Mar. 17, 2020, entitled "Systems and Methods for Customized Camera Views in Virtualized Environments," which is a continuation of, and claims priority benefit of, U.S. patent application Ser. No. 15/195,943, filed Jun. 28, 2016, now U.S. Pat. No. 10,004,991, issued on Jun. 26, 2018, entitled "Systems and Methods for Customized Camera Views in Virtualized Environments." The aforementioned disclosures are hereby incorporated by reference herein in their entirety including all references and appendices cited therein.

FIELD OF THE INVENTION

The present technology is directed to video game control systems, and more particularly, but not by limitation, to systems and methods that allow a user to selectively control a gameplay event of interest within a video game by creating customized camera views during an event time.

SUMMARY

According to some embodiments, the present technology is directed to a method comprising: (a) detecting discharging of a weapon within a virtual gaming environment during a gameplay event of interest; (b) providing an interactive user interface that receives user input to create a customized camera viewing experience of the gameplay event of interest involving a target; (c) receiving the user input from the interactive user interface; and (d) providing a customized camera view of the gameplay event of interest based on the user input.

According to some embodiments, the present technology is directed to a method comprising: (a) detecting discharging of a projectile within a virtual gaming environment during a gameplay event of interest; (b) providing an interactive user interface that receives user input to alter a camera view of the gameplay event of interest to create a customized camera view; and (c) providing a customized camera view of the gameplay event of interest based on the user input, wherein the customized camera view has a focal point of the projectile or a target of the gameplay event of interest.

According to some embodiments, the present technology is directed to a method comprising: (a) detecting a gameplay event of interest within a virtual gaming environment; and (b) displaying a customized camera view of the gameplay event of interest based on user input received during traversal of a projectile from a weapon to a target, wherein the customized camera view has a focal point of the projectile.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
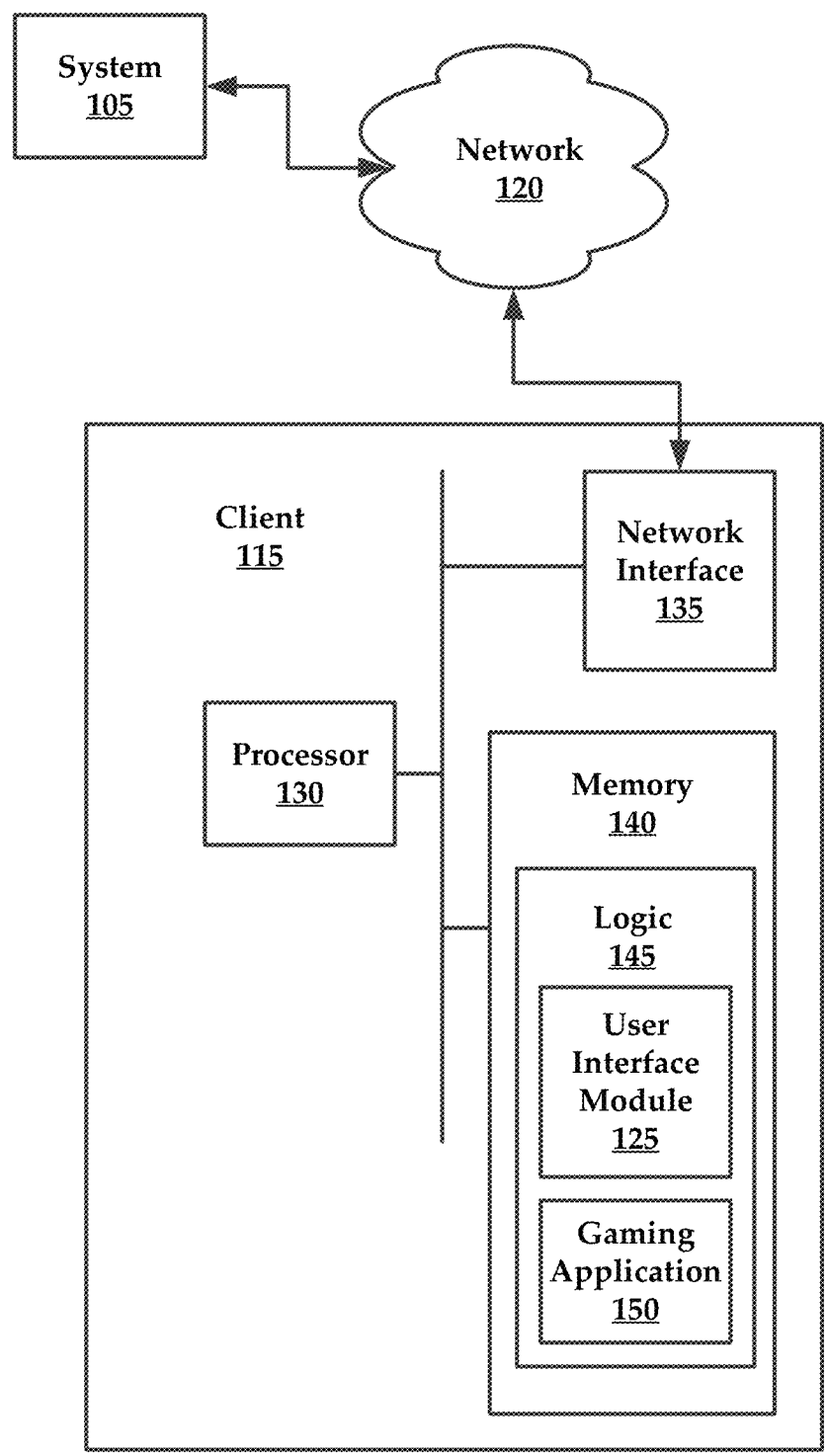
FIG. 1 is a schematic diagram of an example system for practicing aspects of the present technology.

The present disclosure is directed to systems and methods for providing customized camera views within gaming environments. For example, a user selectable camera view can be provided during a gameplay event of interest such as gameplay event of interest within a video game. In one embodiment, the focal point of the camera view is a projectile being discharged from a firearm.

By way of another example, at the end of a mission, when the player fires a winning shot (or any other shot of interest), a slow-motion camera presentation tracks a projectile leaving the player's weapon, travelling across the map, and hitting a target. This presentation is referred to as the "Shot Cam". While the Shot Cam is active the player can drag their finger (or mouse click) across the screen to adjust the camera's angle. The projectile will remain the camera's focal point.

In some embodiments, the players can take screen captures of the Shot Cam, and save these to their game device, by tapping a screen capture button displayed during the Shot Cam event.

According to some embodiments, a passive tutorial teaches players how to adjust the camera's angle. For example, a small graphic at the bottom of the screen, which depicts a finger swiping back and forth, will be displayed during the Shot Cam. After the player successfully performs the swiping action in two or more Shot Cam events the graphic will no longer be displayed—just as an example implementation.

Additional presentation elements can be implemented in some embodiments. In one embodiment an X-ray mode can be utilized to show internal damage to targets (see FIG. 8). Some embodiments may show the bullet exiting the target.

In another embodiment the camera angle is provided from the target perspective. In yet another embodiment the gameplay event of interest will comprise a trigger for all explosive props in an environment when the projectile impacts the target (see FIGS. 9A-9B).

In some embodiments, the user can call out shot types on target death such as head shot, gut shot, heart shot, and so forth.

The gaming system can also transition targets into "ragdoll" physics when hit, to allow for surprising interactions between the target and the environment. For example, a user can fall off buildings or be thrown into the air by explosions. Another embodiment allows for players or objects to be knocked into other players during explosions.

Additional environmental projectile related events can be implemented such as dropping things, breaking bridges, knocking over towers, electrocution, and so forth.

In an example embodiment, a visually enhanced view frame or tracking of multi-kills can occur when projectiles penetrate through multiple targets or multiple targets are thrown into the air by explosions.

The systems and methods can also improve or enhance visual details of a target such as decaling, to enhance the appearance of the target for a more realistic experience.

The systems and methods can also implement custom prop interactions, such as when shooting through an enemy sniper's scope a shower of glass and sparks occur. These are merely examples of gameplay event of interest enhancements that are not intended to be limiting but are provided for purposes of illustration.

According to the present disclosure, as users spend more time with the game, the system can allow the user to unlock or purchase new content that can be seen during a Shot Cam event. Examples of new content can include new kill shot cameras, new enemy death animations, color filters to the kill shot, bullet tracer effects seen during Shot Cams, new bullet skins (which may also dictate which camera angles are selected), text labels and stickers attached to screen captures, target death effects (e.g., enhancements of the event of interest), or any combinations thereof.

In addition to controlling the camera's angle, a "director's suite" of tools will be included, which allow the player to pause, rewind, and edit the Shot Cam presentation.

In some embodiments, after viewing the Shot Cam presentation, players have the option to share with other players through various social media platforms such as FACEBOOK™, TWITTER™, INSTAGRAM™, and so forth. In some embodiments, users can share videos of an entire mission, the Shot Cam event itself, videos of a player-edited Shot Cam, and/or the customized screen captures from a Shot Cam. Users can save images for later use in a variety of settings, such as email tags, forum postings, and so forth.

These and other advantages of the present technology are provided herein with reference to the collective drawings.

FIG. 1 illustrates an exemplary architecture for practicing aspects of the present technology. The architecture comprises a server system, hereinafter "system 105," that is configured to provide various functionalities, which are described in greater detail throughout this document. Generally the system 105 is configured to communicate with client devices, such as client 115. The client 115 may include, for example, a Smartphone, a laptop, a computer, or other similar computing device. An example of a computing device that can be utilized in accordance with the present technology is described in greater detail with respect to FIG. 7.

The system 105 may communicatively couple with the client 115 via a public or private network, such as network 120. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 120 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The client 115 generally comprises a processor, 130, a network interface 135, and a memory 140. According to some embodiments, the memory 140 comprises logic (e.g., instructions) 145 that can be executed by the processor 130 to perform various methods. For example, the logic may include a video game client application (hereinafter "gaming application 150"), which is configured to provide the functionalities described in greater detail herein.

It will be understood that the functionalities described herein, which are attributed to the system 105, may also be executed within the client 115. That is, the client 115 may be programmed to execute the functionalities described herein. In other instances, the system 105 and client 115 may cooperate to provide the functionalities described herein, such that the client 115 is provided with a client-side application that interacts with the system 105 such that the system 105 and client 115 operate in a client/server relationship. Complex computational features may be executed by the system 105, while simple operations that require fewer computational resources may be executed by the client 115, such as data gathering and data display.

In general, a user interface module 125 may be executed by the client 115 to provide various graphical user interfaces (GUIs) that allow users to interact with the system 105. In some instances, GUIs are generated by execution of the gaming application 150. Users may interact with the system 105 using, for example, a client 115. The system 105 may generate web-based interfaces for the client.

The gaming application 150 can be executed locally on a user device (e.g., client 115), such as a Smartphone or tablet device. Alternatively, the gaming application 150 can be accessed by a user device over a network. Thus, the gaming application 150 can be executed on a server and accessed by the user device using a browser application. The server will serve GUIs of the gaming application 150 as web pages of a standard or mobile website.

In some embodiments, the gaming application 150 is configured to provide the user with a gaming experience, such as a virtual gaming environment where the user participates in gameplay. Examples of virtual gaming environments include, but are not limited to, role playing games, first person shooter games, multiplayer games, sporting games, and so forth.

Figure 2:
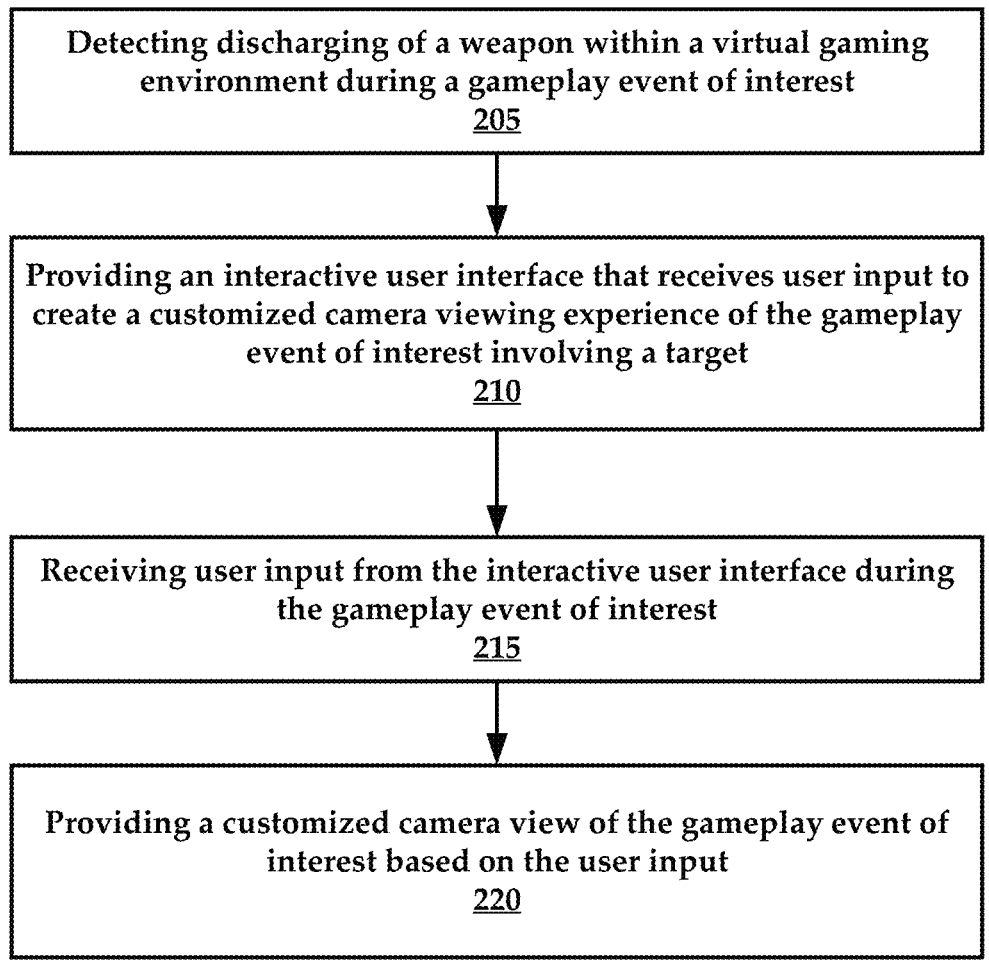
FIG. 2 is a flowchart of a method for providing a customized camera view during a gameplay event of interest.

According to some embodiments, the gaming application 150 is configured to provide the user with Shot Cam features, which allow the user to create customized camera views of gameplay events of interest, such as the use of a weapon within the game FIG. 2 is a flowchart of an example method for providing a customized camera view during a gameplay event of interest. The method can be executed by either the system 105 or the client 115. The following description is illustrative of the method being executed by the client 115. In some embodiments, the method includes detecting 205 discharging of a weapon within a virtual gaming environment during a gameplay event of interest. For example, a gameplay event of interest can include an end of mission or game activity where a target, such as an enemy, is killed by a player. The gameplay event of interest is due to a player shooting the target in a manner that results in a compelling or interesting animation event (or other similar event) of the target. The compelling/interesting shot could also include an explosion of a target other than a person such as a building or vehicle, just as another example.

In another embodiment, the Shot Cam can be invoked any time a player kills another player during gameplay. Thus, the gameplay event of interest need not be tied to an end of mission or game event.

When the client detects that a weapon has been discharged and that such discharging is tied to a kill shot event, the method includes providing 210 an interactive user interface that receives user input to create a customized camera viewing experience of the gameplay event of interest involving a target. An example of an interactive user interface can be found in FIG. 5. The interactive user interface can include an initial view that comprises a camera view of the virtual gaming environment that has a projectile directed at the target.

The interactive user interface comprises a view of the game environment with an input mechanism such as a touch screen input. The coupling of the input mechanism with the view creates the interactive user interface. In one embodiment, the input mechanism is a hand icon that can be selected through touch input or mouse click input.

Once the interactive user interface is displayed, the method includes receiving 215 user input from the interactive user interface. For example, the user can input swipe, tap, or pinch gestures as user input. Each of these gestures can be associated with a controlling aspect that creates a customized camera view. For example, swiping laterally on the visual icon rotates the camera view around the projectile in a horizontal manner. A longitudinal swipe causes the camera view to rotate around the projectile in a vertical manner. Swipes in between lateral and longitudinal provide camera view rotations that have both horizontal and vertical components. Pinching gestures can create zoom effects in and out relative to the projectile.

In some embodiments, touch and tap gestures can be utilized to speed up or slow down movement of projectile towards the target. Thus, a player can view the compelling/interesting shot in slow motion, with a customized camera view having a focal point of the projectile.

Once the user input is received, the method includes providing 220 a customized camera view of the gameplay event of interest based on the user input.

As mentioned above, in some embodiments, if the user input comprises a click or tap within the interactive user interface, the bullet slows its traversal speed towards the target. If the user input of the click or tap is removed the bullet increases its traversal speed towards the target.

If the user input comprises a swipe action within the interactive user interface, a rotation of camera angle of the customized camera view occurs. Again, this rotation can include both vertical and horizontal components. The rotation of the camera angle can correspond to a direction of the swipe action.

Figure 8:
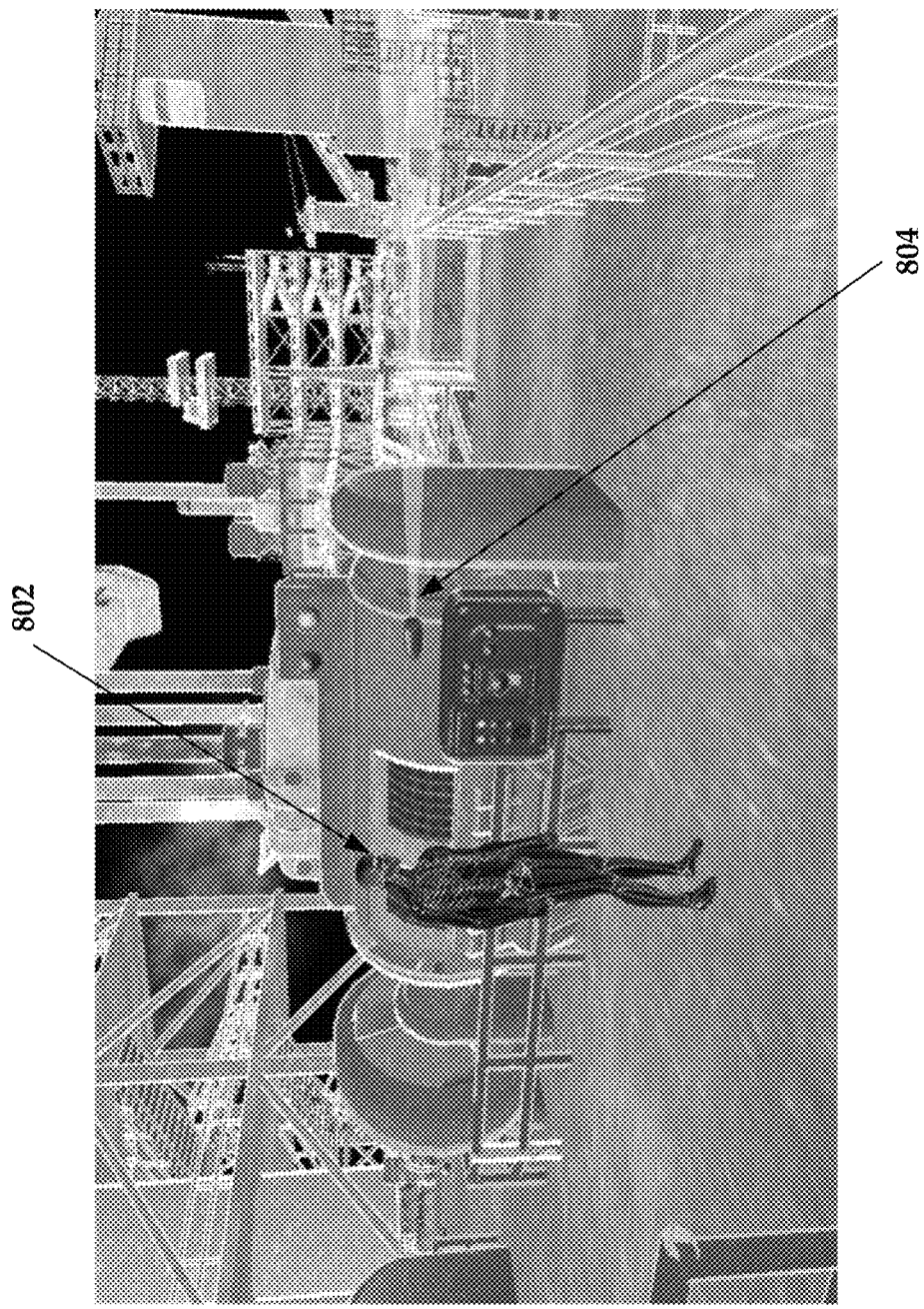
FIG. 8 illustrates a view of a gameplay event of interest that comprises an X-ray view of a target.
Figure 9A:
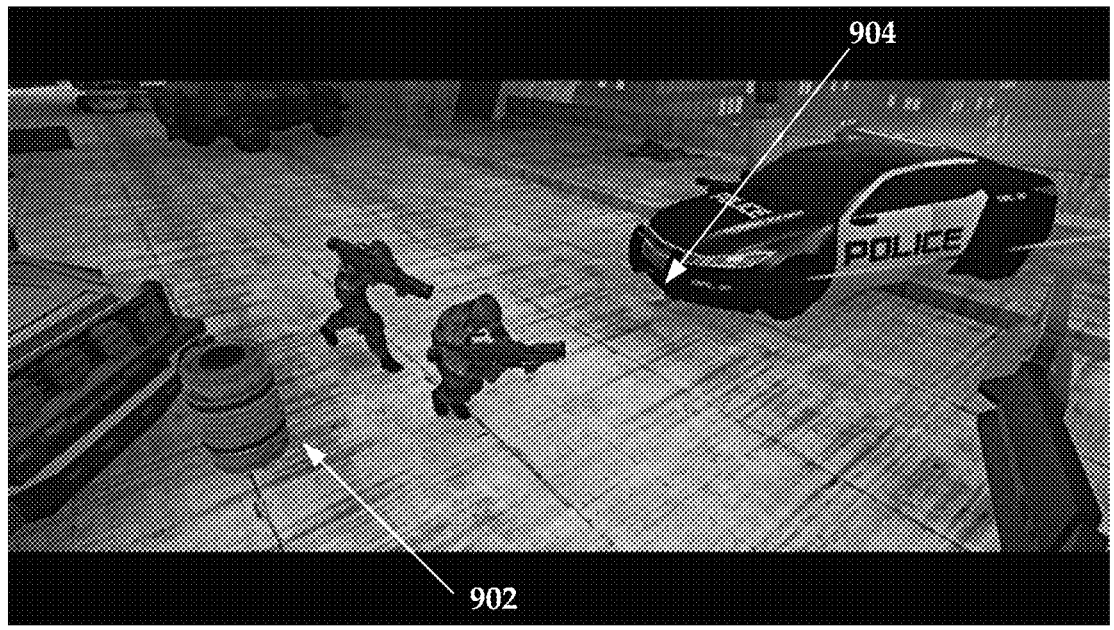
FIGS. 9A and 9B collectively illustrate views of an explosion of a target during a gameplay event of interest.
Figure 9B:

As illustrated in FIG. 8, the client can display an x-ray view of the target 802 as a projectile 804 approaches the target 802. As illustrated in FIGS. 9A and 9B, the client can detonate explosive props 902 within the virtual gaming environment when impacted with a projectile 904.

Figure 3:
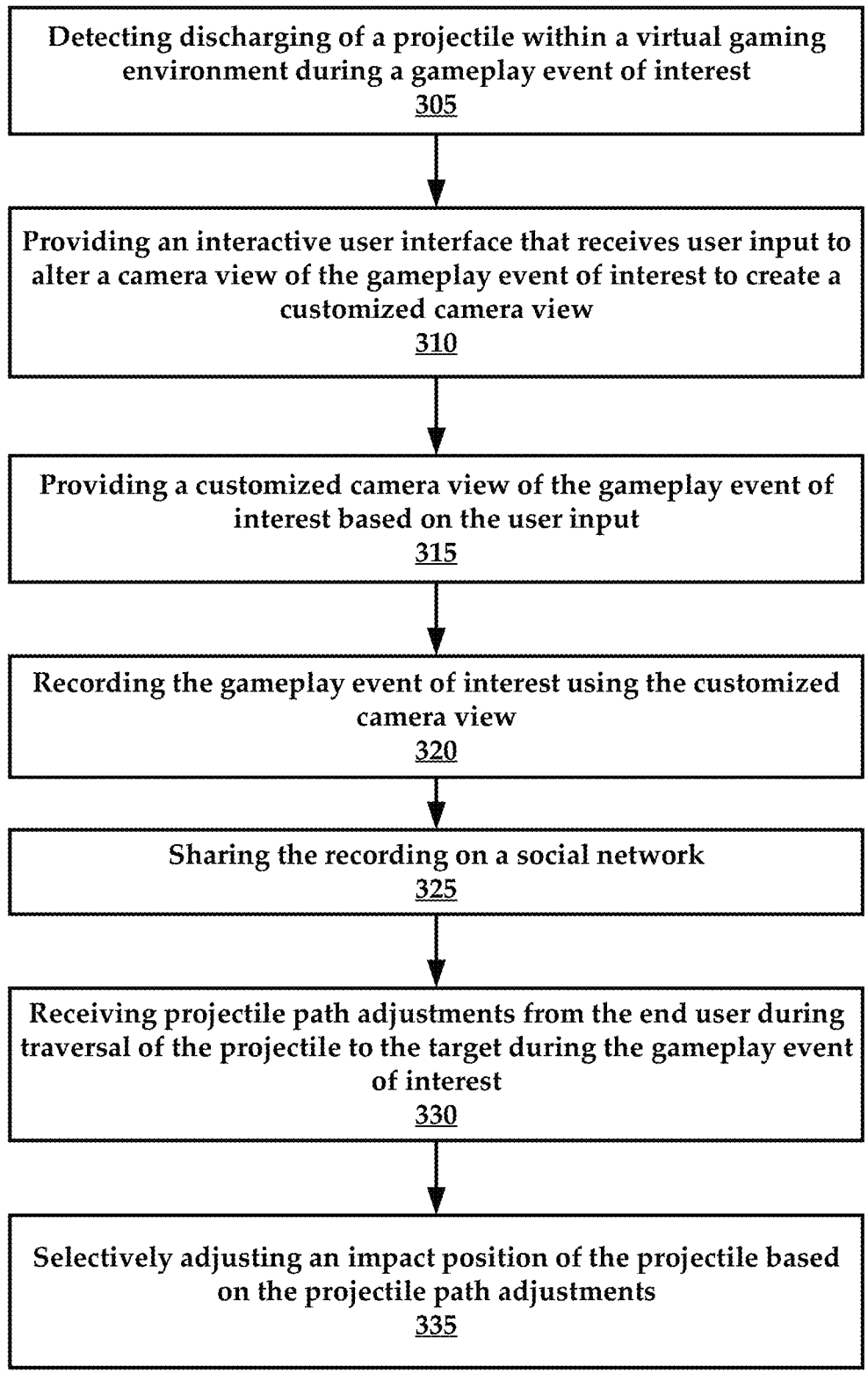
FIG. 3 is a flowchart of an example method for providing a customized camera view during a gameplay event of interest.

FIG. 3 is flowchart of another example method for providing a customized gameplay event of interest view. According to some embodiments, the method includes detecting 305 discharging of a projectile from a firearm within a virtual gaming environment during a gameplay event of interest. As mentioned above, this can include a player firing a weapon during game play, where the firing of the weapon is determined by the gaming application to be a gameplay event of interest where the target is killed.

The method also includes providing 310 an interactive user interface that receives user input to alter a camera view of the gameplay event of interest to create a customized camera view. The method can also comprise providing 315 a customized camera view of the gameplay event of interest based on the user input. To be sure, the customized camera view has a focal point of the projectile or a target of the gameplay event of interest. In some embodiments, the focal point can be changed to a focal point of the target.

Next, the method comprises recording 320 the gameplay event of interest using the customized camera view and sharing 325 the recording on a social network.

In some embodiments, the customized camera view can include a rear trailing view, a side tracking view, an orbiting view, all of which have a focal point of the projectile.

In one embodiment, the method can include selectively changing a color filter of the customized camera view. In another embodiment, the method comprises placing projectile tracer effect into the customized camera view.

Figure 10A:
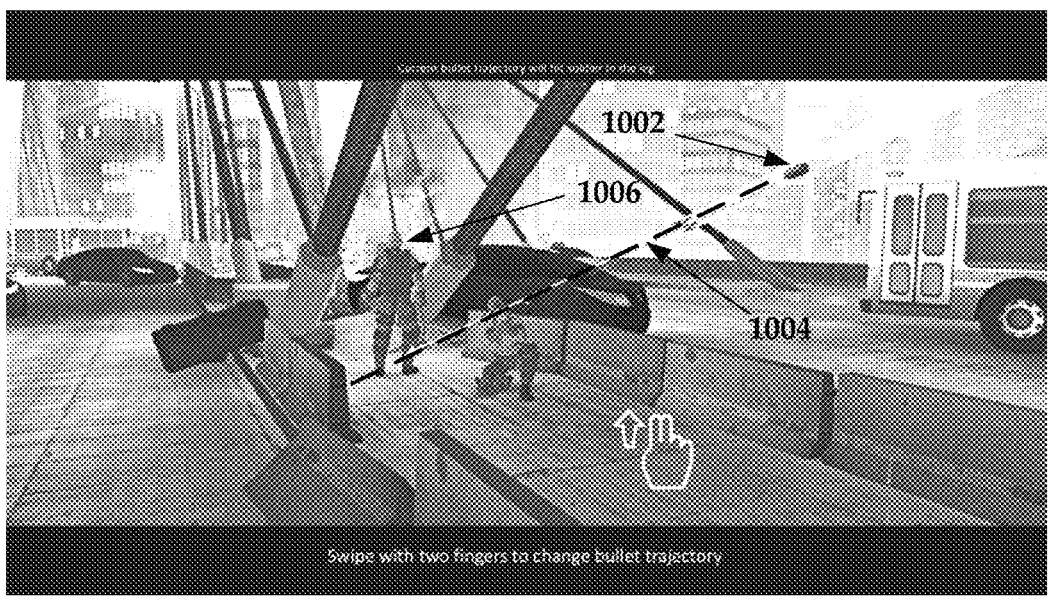
FIGS. 10A and 10B collectively illustrate views of a user selectively altering a projectile path during a gameplay event of interest.
Figure 10B:
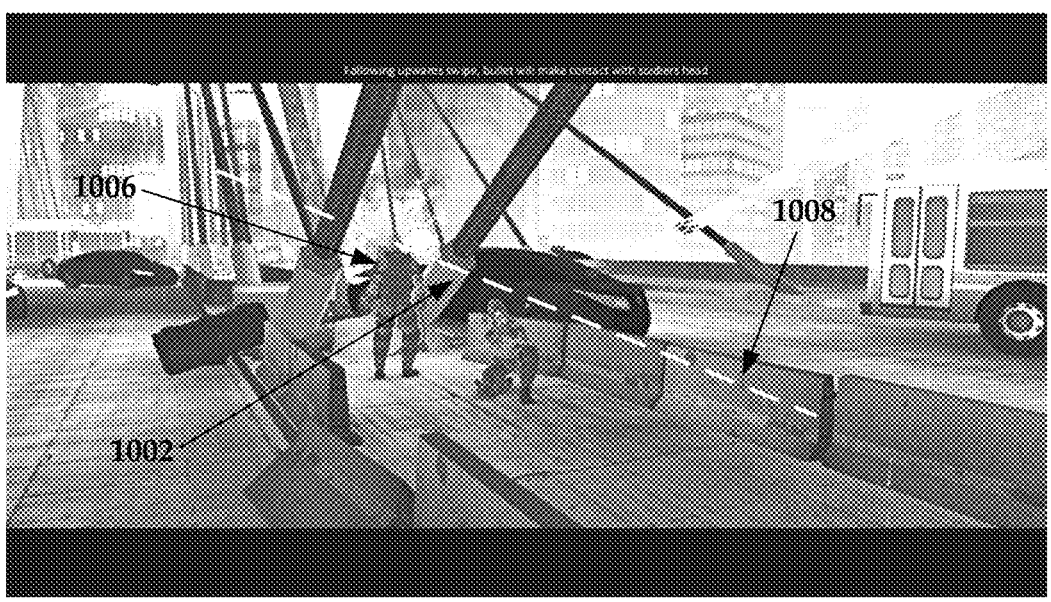

According some embodiments, the method can comprise receiving 330 projectile path adjustments from the end user during traversal of the projectile to the target during the gameplay event of interest. Using the adjustments the method can include the gaming application selectively adjusting 335 an impact position of the projectile based on the projectile path adjustments. An example of the effect is illustrated in FIGS. 10A and 10B.

For example, the user can select the projectile with a tap or double tap action. When the user selects the projectile, the user can drag the projectile into having a different trajectory from its initial trajectory. This can cause the projectile to impact the target at a different location than its initial impact location would have been when the projectile was initially discharged. For example, if the projectile was discharged onto a path where the projectile was to impact the torso of the target, the user can selectively alter the trajectory of the projectile such that it impacts a head of the target instead. In some embodiments, the user is provided with a trajectory line that illustrates a current path of the projectile. This line is selectively adjusted as the user moves the bullet around the gaming environment.

Figure 4:
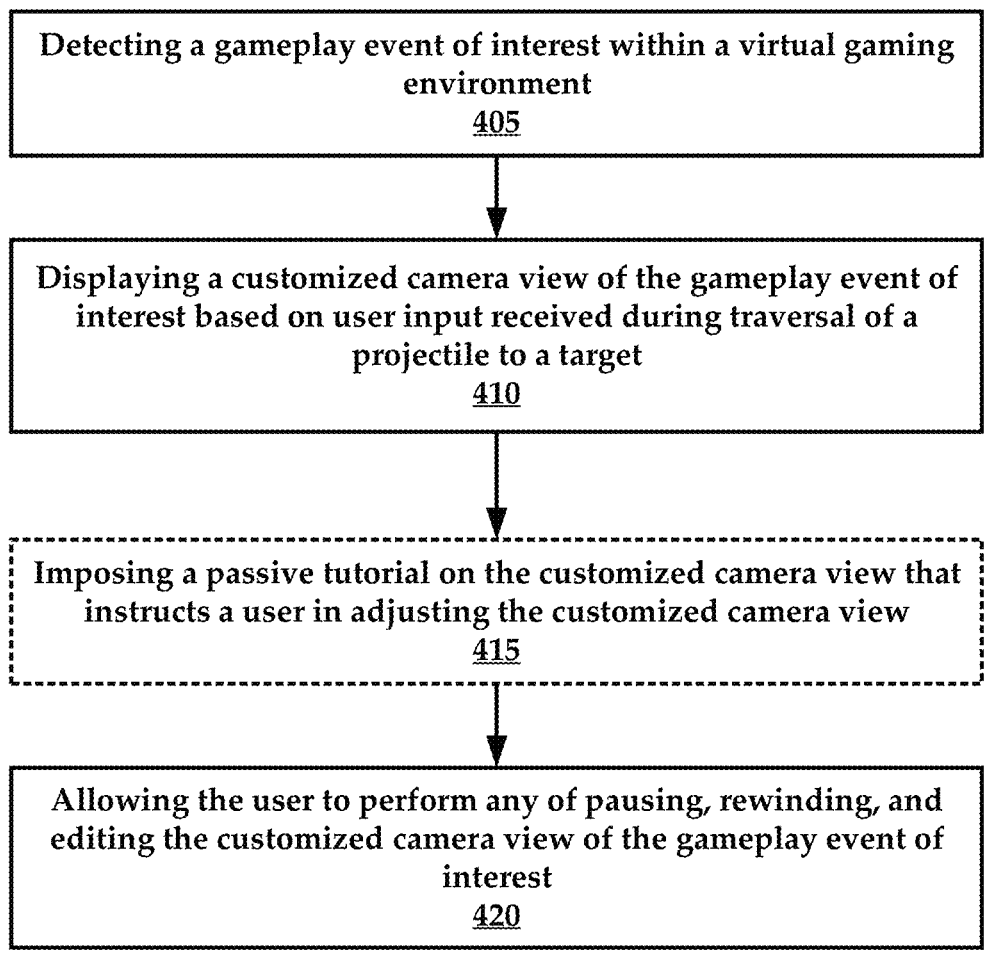
FIG. 4 is a flowchart of another example method for providing a customized camera view during a gameplay event of interest.

FIG. 4 illustrates another flowchart of a method for providing a customized camera view of a gameplay event of interest. In this embodiment, the method includes detecting 405 a gameplay event of interest within a virtual gaming environment. The method also includes displaying 410 a customized camera view of the gameplay event of interest based on user input receiving during traversal of a projectile from a weapon to a target. Again, the customized camera view has a focal point of the projectile. The method can optionally include imposing 415 a passive tutorial on the customized camera view that instructs a user in adjusting the customized camera view. In another embodiment, the method includes allowing 420 the user to perform any of pausing, rewinding, and editing the customized camera view of the gameplay event of interest.

Figure 5:
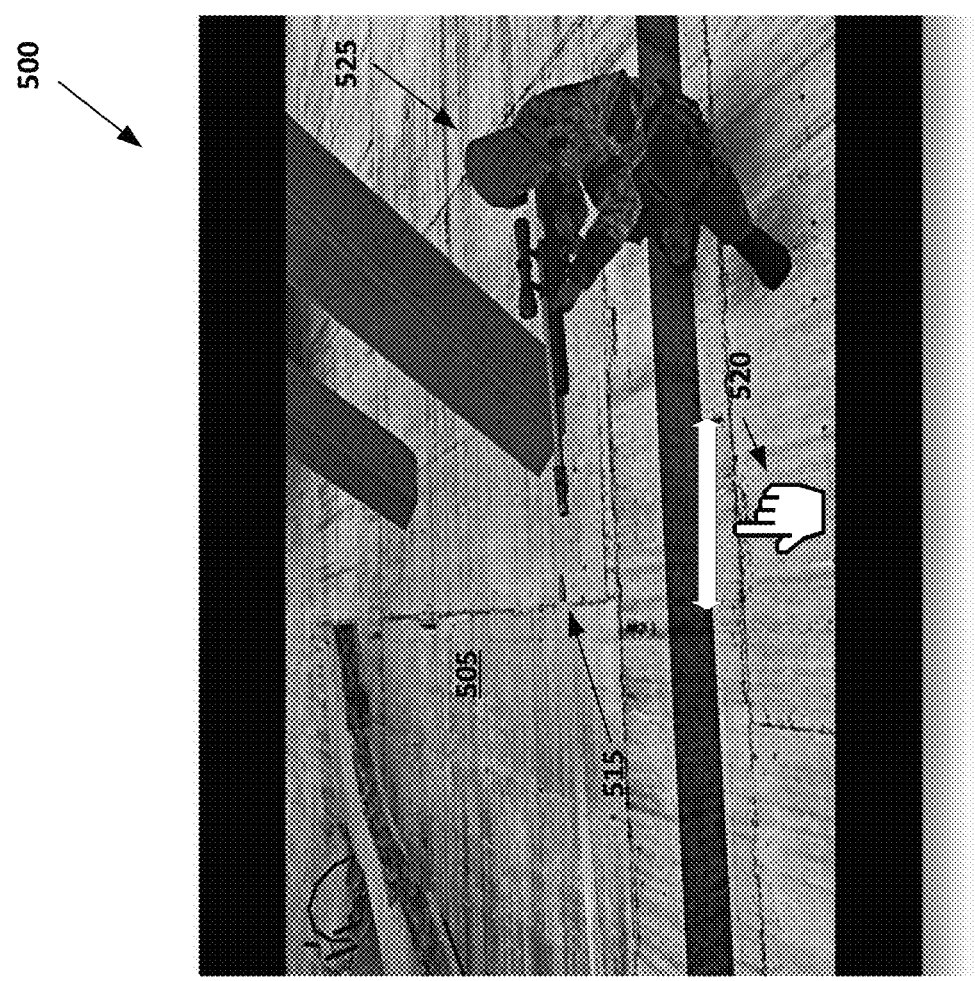
FIG. 5 is a screenshot of an interactive user interface that receives user input to create a customized camera view of a gameplay event of interest.

FIG. 5 illustrates an example interactive user interface 500 that comprises a view of a gaming environment 505 after the initiation of a gameplay event of interest. The gameplay event of interest is displayed initially from the view point of a player who has discharged a weapon. A rear view of a projectile 515 (e.g., a bullet) is provided. Associated with the projectile 515 is a passive tutorial icon 520 that instructs the user to swipe or otherwise provide tactile input to create a customized camera view.

For example, the passive tutorial icon 520 includes a hand with extended index finger and a directional arrow. The user can provide their user input onto the interactive user interface 500, and specifically with reference to the passive tutorial icon 520.

Figure 6:
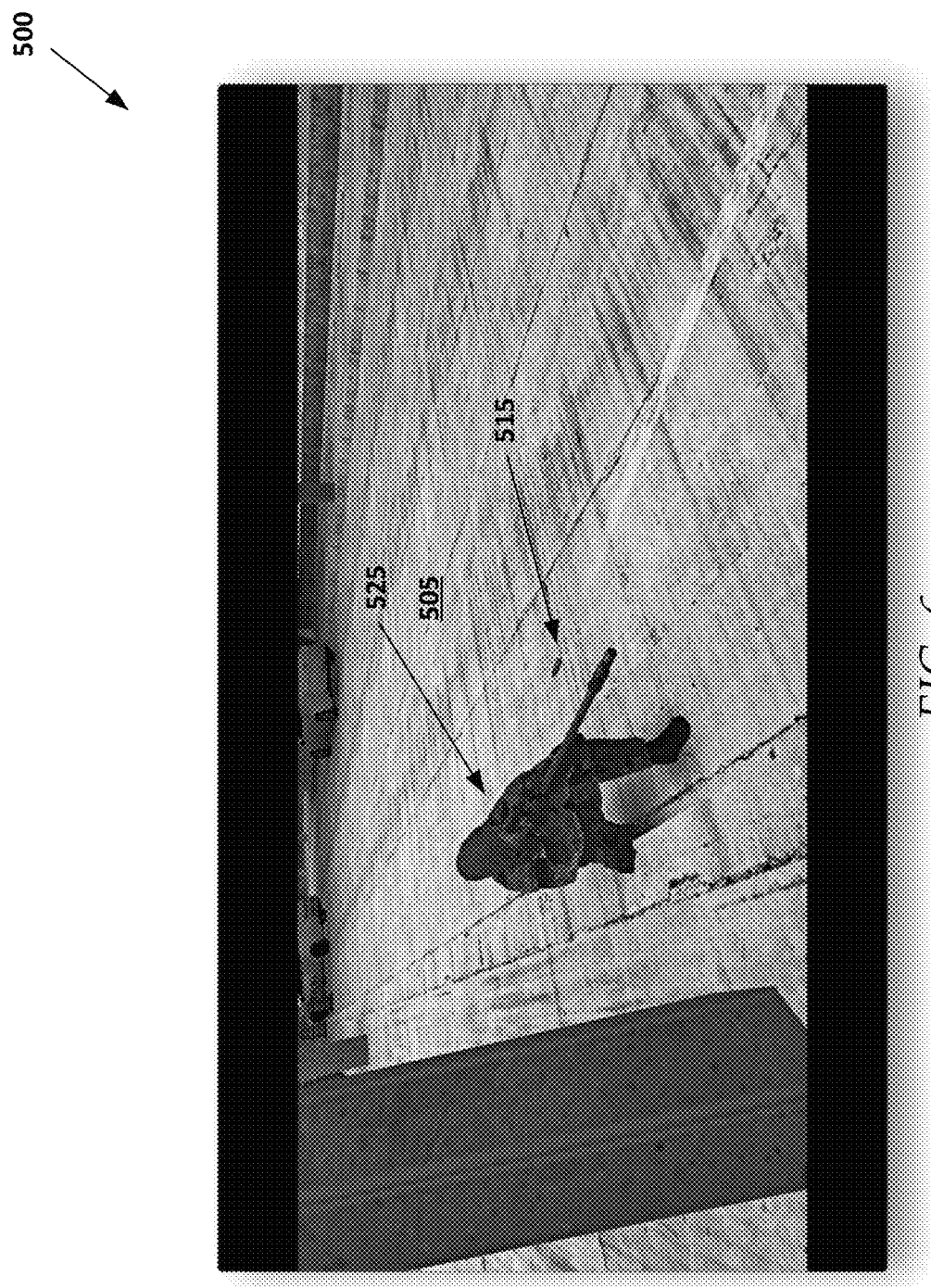
FIG. 6 is a screenshot of a customized camera view created from the user input received in FIG. 5.

The input is received by the gaming application and translated into camera view customization parameters. For example, if the user swipes horizontally, the camera view will rotate around the projectile 515, changing the camera view from the initial position as illustrated in FIG. 6. In FIG. 6, the view of the gameplay event has changed through rotation of a camera view about a focal point of the bullet. Whereas in FIG. 5, the view is of a left-handed side of a target 525, the view in FIG. 6 is of a right-handed side of the target 525. Collectively, FIGS. 5 and 6 illustrate the process of allowing a user to selectively change a camera view around a focal point during gameplay.

Again, the user can also utilize input to slow down, speed up, or change the trajectory of the bullet.

In some embodiments, hardware on the user device can be utilized to control the camera view. By way of example, an accelerometer or other position/orientation sensing device of the client (such as a Smartphone or tablet) can be used to control the camera view. In an example use case, the user is engaged in game play on their mobile device. During game play the user fires a weapon as described above. Once the bullet is traveling to a designated target, the user can tilt the mobile device. The tilt of the mobile device can occur relative to a horizontal plane, a vertical plane, or combinations thereof. As the user tilts the mobile device, the camera view is selectively changed to match. When the user tilts the phone in the horizontal plane the camera view is shifted left or right around the bullet. When the user tilts the phone in the vertical plane the camera view is shifted above or below the bullet. Combinations of horizontal and vertical tilt will allow the user to place the camera view at any angle relative to the bullet and provide a more robust and granular mechanism for selecting camera view position.

As mentioned above, FIGS. 10A and 10B illustrate the selective changing of a projectile path by a user during an event of interest. For example, FIG. 10A illustrates a projectile 1002 traveling on an initial path 1004, visually illustrated with a tracer path. In this instance the projectile 1002 is traveling approximately at the leg of a target 1006. Referring to FIG. 10B, when the user touches or clicks the display (in this example using a two finger swipe action) of their device during this event, the user can swipe upwards to change the projectile 1002 onto a second path 1008 that is aligned with a head of the target 1006.

As mentioned above, the interactive display provided to the player occurs when the player discharges a firearm or otherwise activates an instance of the interactive display (such as with a unique set of keystrokes or button sequences).

As used herein, the term "module", "controller", or "application" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

Figure 7:
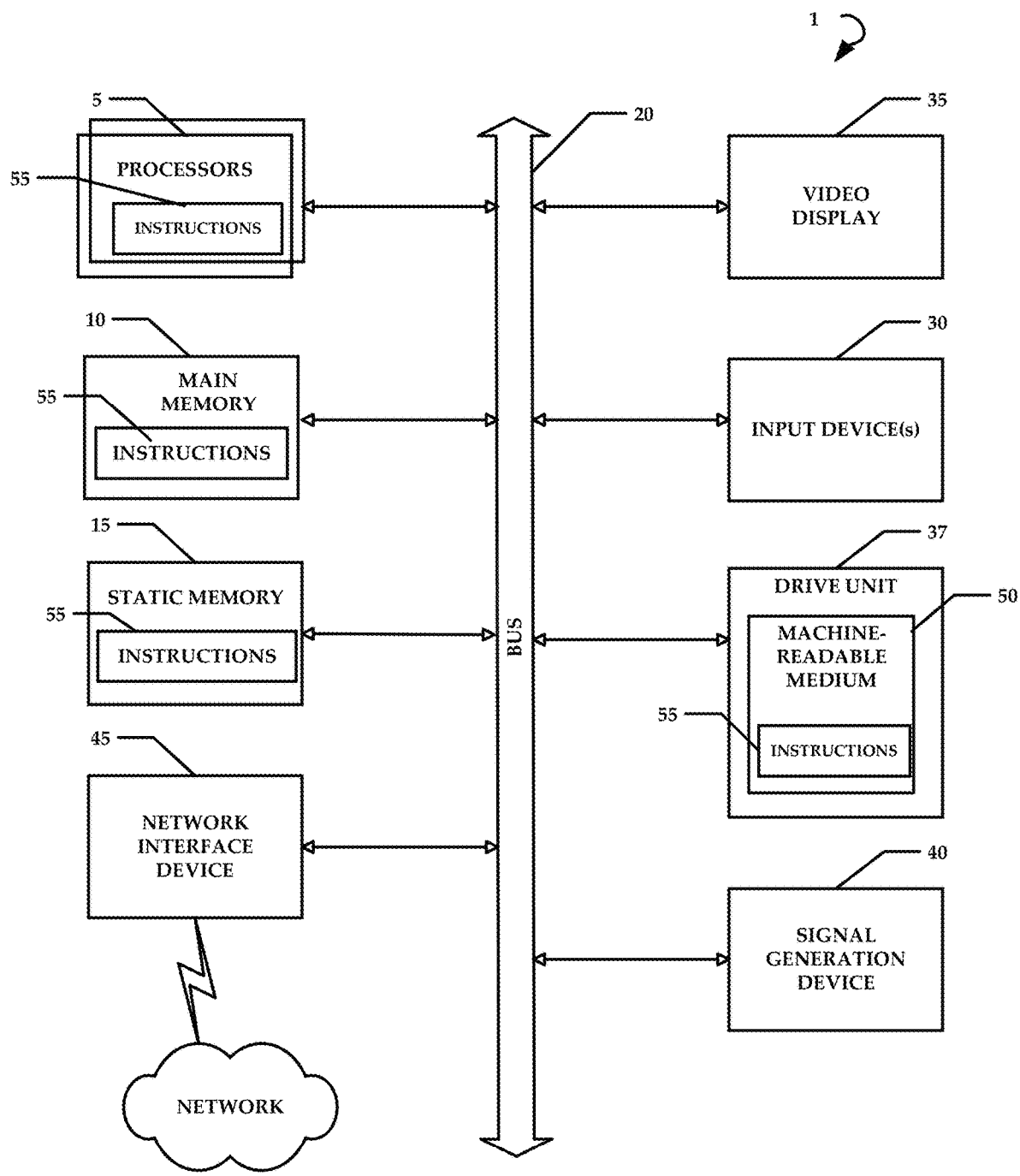
FIG. 7 is a schematic diagram of an example computer device that can be utilized to implement aspects of the present technology.

FIG. 7 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of non-generic machines that individually or jointly execute a set (or multiple sets) of instructions to perform any one or more of the methodologies discussed herein. To be sure, the methodologies described herein, while amenable to execution through the hardware described herein, encompass unconventional and non-routine processes which would be executable by any generic computer hardware using well understood hardware and software. That is, the systems described herein are specific purpose computing machines.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
   providing a virtual gaming environment on a touch screen display device, the touch screen display device receiving touch-based user input comprising any of a swipe, tap or pinch on the touch screen display device to create a customized camera viewing experience of a gameplay event of interest involving a target, wherein the customized camera viewing experience comprises an entire event from discharging, traveling, and hitting of the target by a projectile;
   during the traveling of the projectile, receiving the touch-based user input on the touch screen display device;
   providing a customized camera view of the gameplay event of interest based on the touch-based user input; and
   detonating explosive props within the virtual gaming environment when the target is impacted.

2. The method according to claim 1, further comprising automatically capturing screenshots during the customized camera viewing experience.

3. The method according to claim 1, wherein when the touch-based user input comprises a touch within an interactive graphical user interface displayed on the touch screen display device, the projectile slows its traversal speed towards the target.

4. The method according to claim 3, wherein if the touch-based user input is removed, the projectile increases its traversal speed towards the target.

5. The method according to claim 1, wherein when the touch-based user input comprises a swipe action within the touch screen display device, a rotation of camera angle of the customized camera view occurs.

6. The method according to claim 5, wherein the rotation of the camera angle corresponds to a direction of the swipe action.

7. The method according to claim 6, wherein a focal point of the customized camera view is the projectile discharged from a weapon.

8. The method according to claim 1, further comprising displaying an x-ray view of the target as the projectile impacts the target.

9. The method according to claim 1, wherein the customized camera view comprises a camera angle that is provided from the target's perspective.

10. A method, comprising:
providing a virtual gaming environment on a display device that receives touch-based user input that is used to alter a camera view of a gameplay event of interest to create a customized camera view during the gameplay event of interest;
providing the customized camera view of the gameplay event of interest based on the touch-based user input, wherein the customized camera view has a focal point of a projectile or a target of the gameplay event of interest;
during traveling of the projectile, receiving the touch-based user input on the display device; and
selectively changing the customized camera view, wherein the customized camera view comprises a visually altered view frame or tracking when the projectile penetrates a target, the customized camera view further comprising a path highlight effect.

11. The method according to claim 10, further comprising selectively changing a color filter of the customized camera view.

12. The method according to claim 10, further comprising:
receiving projectile path adjustments from an end user during traversal of the projectile to a target during the gameplay event of interest; and
selectively adjusting an impact position of the projectile based on the projectile path adjustments.

13. A method, comprising:
displaying a customized camera view of a gameplay event of interest based on touch-based user input received on a touch screen display device during traversal of an object to a target, the customized camera view having a focal point of the object, wherein the customized camera view comprises an event sequence involving the object;
displaying an x-ray view of the target as the object impacts the target; and
rotating a camera angle of the customized camera view based on a swipe action received during the event sequence.

14. The method according to claim 13, further comprising imposing a passive tutorial on the customized camera view that instructs a user in adjusting the customized camera view.

15. The method according to claim 14, further comprising allowing the user to perform any of pausing, rewinding, and editing the customized camera view of the gameplay event of interest.

16. The method according to claim 13, wherein a point of view of the customized camera view is from a perspective of the target.

17. The method according to claim 13, further comprising placing projectile tracer effect into the customized camera view.

* * * * *